United States Patent
Downs-Razouk et al.

(10) Patent No.: US 12,406,323 B2
(45) Date of Patent: Sep. 2, 2025

(54) SPLITTING VIRTUAL GRAPHICS PROCESSING UNIT (GPU) DRIVER BETWEEN HOST AND GUEST OPERATING SYSTEMS

(71) Applicant: Google LLC, Mountain View, CA (US)

(72) Inventors: Colin Downs-Razouk, San Francisco, CA (US); Rahul Chaturvedi, San Francisco, CA (US); Mateusz Maria Przybylski, Folsom, CA (US); Kaiyi Li, San Francisco, CA (US); Ivan Neulander, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 203 days.

(21) Appl. No.: 18/453,092

(22) Filed: Aug. 21, 2023

(65) Prior Publication Data

US 2025/0069180 A1 Feb. 27, 2025

(51) Int. Cl.
*G06T 1/20* (2006.01)
*G06F 9/54* (2006.01)

(52) U.S. Cl.
CPC ............. *G06T 1/20* (2013.01); *G06F 9/545* (2013.01)

(58) Field of Classification Search
CPC ....... G06T 1/20; G06F 9/45558; G06F 9/545; G06F 2009/45579
USPC ......................................................... 345/501
See application file for complete search history.

(56) References Cited

U.S. PATENT DOCUMENTS

| 11,175,936 | B2 * | 11/2021 | Nair ..................... G06F 3/0665 |
| 2011/0102443 | A1 | 5/2011 | Dror et al. |
| 2013/0293557 | A1 | 11/2013 | Diard |
| 2014/0173628 | A1 * | 6/2014 | Ramakrishnan Nair ................... G06F 9/45533 718/108 |

OTHER PUBLICATIONS

International Search Report and Written Opinion of International Application No. PCT/US2024/039831 dated Nov. 28, 2024, 12 pp.
Wang et al., "SEGIVE: A practical framework of secure GPU execution in virtualization environment", 2020 IEEE 39th International Performance Computing and Communications Conference (IPCCC), IEEE, Nov. 6, 2020, 10 pp.

* cited by examiner

*Primary Examiner* — Jacinta M Crawford
(74) *Attorney, Agent, or Firm* — Shumaker & Sieffert, P.A.

(57) ABSTRACT

In general, techniques are described for providing a virtual graphics processing unit driver by receiving, in a user mode of a guest process executed by a computing system, one or more graphics commands from an application of the guest process; triggering, in the user mode of the guest process, an operating system call in response to the one or more graphics commands; translating, in a kernel mode of the guest process, the operating system call into a first virtual buffer; translating, in the user mode of a host process executed by the computing system, the first virtual buffer into the operating system call; and sending, in the user mode of the host process, the operating system call to a graphics processing unit driver in a kernel mode of the host process.

20 Claims, 5 Drawing Sheets

SPLITTING VIRTUAL GRAPHICS PROCESSING UNIT (GPU) DRIVER BETWEEN HOST AND GUEST OPERATING SYSTEMS

BACKGROUND

Computing systems may support (or, in other words, host—which may result in such computing systems being referred to as "host computing systems") virtual environments in which virtual instances (such as so-called virtual machines (VMs)) execute as separate processes that share underlying computing hardware (e.g., memory, central processing units (CPUs), graphics processing units (GPUs), interfaces) of the computing system in a restricted manner that limits interactions between VMs. Due to the limits provided by the virtual environments to restrict VM interactions, each VM may appear to both other VMs and other physical computing devices as distinctly different computing systems (even when VMs share the same underlying computing hardware). Such restrictions provided by the virtual environment may provide increased security (as one maliciously configured VM is restricted from directly accessing other VMs), improved reliability for the host computing system (given that failure of one VM may not impact the underlying host computing system), and otherwise allow for increased utilization of available computing resources while reducing the above noted security concerns.

In some instances, the virtual environment may allow for a VM to execute a guest operating system (OS) that is separate from a host OS executed by the host computing system. The guest OS may allow for execution of different applications that are unavailable for execution by the host OS. These different applications may include, for example, various video games that are optimized for the guest OS. The VM may therefore emulate (and may be referred to as an "emulator") the native hardware architecture required for executing the guest OS (along with the video games) and thereby enable the video games to be executed within a different hardware architecture executing the host OS.

SUMMARY

In general, techniques of this disclosure may expose a portion of a GPU driver in a host process to a GPU driver in a guest process. In an implementation, a guest kernel mode virtual input/output (I/O) driver (e.g., a GPU driver back end in the guest) is coupled with a host user mode virtual I/O device (e.g., a GPU driver front end in the host).

In an implementation having a host OS of a first type (e.g., Microsoft® Windows®) and a guest OS of a second type (e.g., Android™), the techniques of this disclosure provide for moving the user mode portion (e.g., the front end) of the GPU driver from the host OS to the guest OS. Then, instead of serializing the graphics APIs, those graphics APIs may call into the guest user mode GPU driver directly and only communications over the channel between a guest kernel mode virtual I/O driver and a host user mode virtual I/O device are serialized. In an implementation where the host OS is Microsoft Windows, this channel is called the Windows Display Driver Model (WDDM), which is simpler and less verbose, and thus the use of which in this manner results in less serialization overhead for processing graphics APIs.

Accordingly, the described techniques may improve operation of the host computing system itself. That is, the host computing system may, by way of executing the improved graphics rendering process, facilitate more optimized execution (in terms of latency, computing resource utilization, such as processor cycles, GPU cycles, memory, memory bandwidth, etc., and associated power consumption) by way of potential improvements over techniques provided by the existing graphics APIs and GPU drivers. This results in a better experience (e.g., faster graphics displays) for users of the applications running on the host computing system.

In one example, various aspects of the techniques are directed to a method including receiving, in a user mode of a guest process executed by a computing system, one or more graphics commands from an application of the guest process; triggering, in the user mode of the guest process, an operating system call in response to the one or more graphics commands; translating, in a kernel mode of the guest process, the operating system call into a first virtual buffer; translating, in the user mode of a host process executed by the computing system, the first virtual buffer into the operating system call; and sending, in the user mode of the host process, the operating system call to a graphics processing unit driver in a kernel mode of the host process.

In another example, various aspects of the techniques are directed to an apparatus including a memory to store a host operating system; and processing circuitry to execute the host operating system, the host operating system including a guest process and a host process, to receive, in a user mode of the guest process, one or more graphics commands from an application of the guest process; trigger, in the user mode of the guest process, an operating system call in response to the one or more graphics commands; translate, in a kernel mode of the guest process, the operating system call into a first virtual buffer; translate, in the user mode of the host process executed by the computing system, the first virtual buffer into the operating system call; and send, in the user mode of the host process, the operating system call to a graphics processing unit driver in a kernel mode of the host process.

In another example, various aspects of the techniques are directed to a non-transitory computer-readable storage medium having instructions stored thereon that, when executed, cause one or more processors to execute a host operating system, the host operating system including a guest process and a host process, to receive, in a user mode of the guest process, one or more graphics commands from an application of the guest process; trigger, in the user mode of the guest process, an operating system call in response to the one or more graphics commands; translate, in a kernel mode of the guest process, the operating system call into a first virtual buffer; translate, in the user mode of the host process executed by the computing system, the first virtual buffer into the operating system call; and send, in the user mode of the host process, the operating system call to a graphics processing unit driver in a kernel mode of the host process.

In still another example, disclosed is a system that includes various means for carrying out each of the operations described herein.

The details of one or more examples are set forth in the accompanying drawings and the description below. Other features, objects, and advantages of the disclosure will be apparent from the description and drawings, and from the claims.

DETAILED DESCRIPTION

Figure 1:
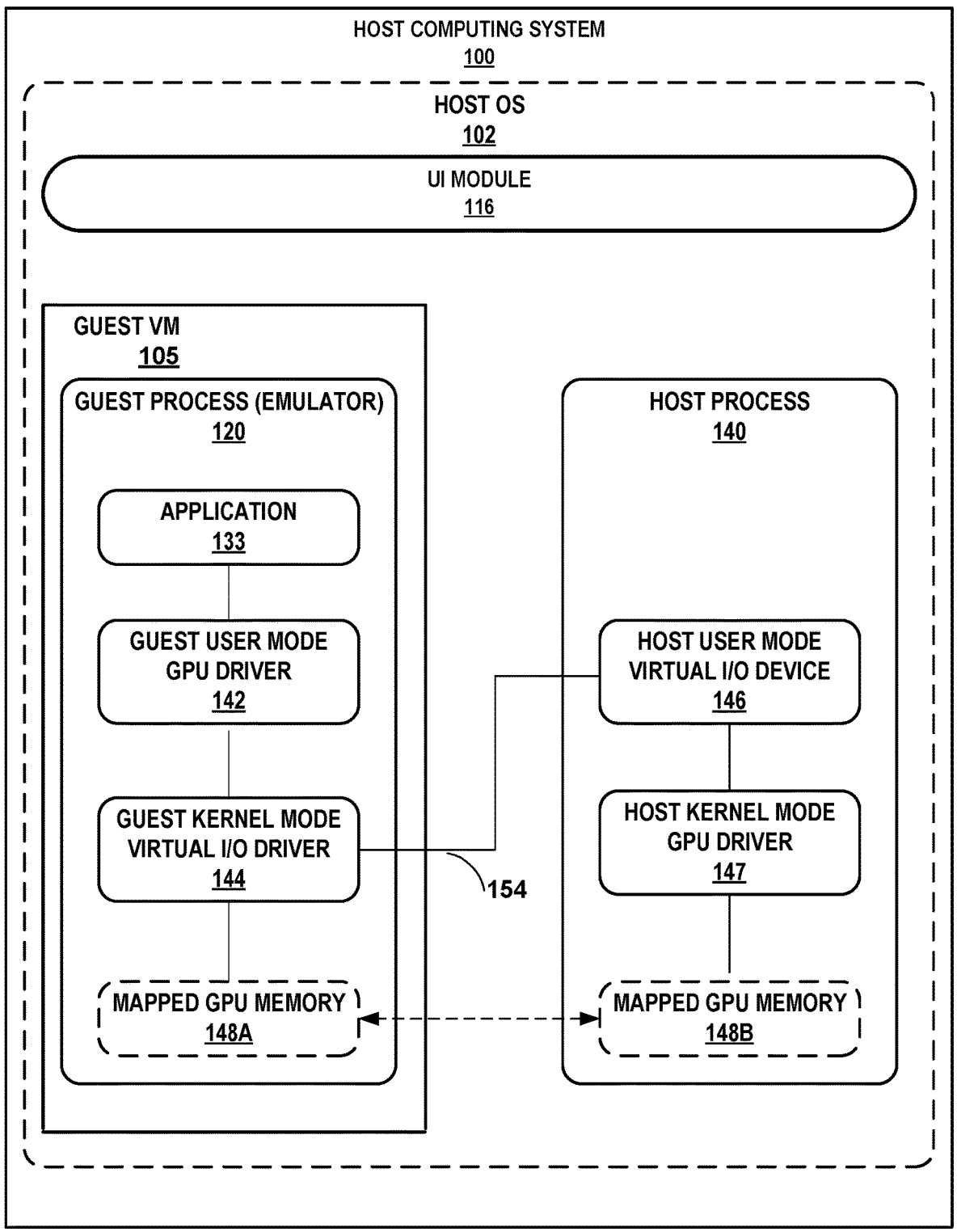
FIG. 1 illustrates an example host computing system to perform various aspects of splitting a GPU driver in accordance with various aspects of the techniques described in this disclosure.

FIG. 1 illustrates an example host computing system 100 to perform various aspects of splitting a GPU driver in accordance with various aspects of the techniques described in this disclosure. Applications running in a guest process (such as video games), typically make calls to display graphical information on a display of a host computing system. Graphics virtualization typically involves serializing graphics application programming interfaces (APIs) (e.g., Open GL, Vulkan, or D3D12, for rendering two-dimensional (2D) and three-dimensional (3D) vector graphics) over a host OS hypervisor boundary and replaying those APIs in a host process. This approach is usually taken because these graphics APIs are agnostic to host computing system hardware, the host OS, and/or the guest OS. These APIs are well defined, but often are verbose and complicated, and the process of serializing and deserializing these APIs consumes considerable overhead. The present disclosure describes an approach where a user mode portion of the GPU driver is moved from the host process to the guest process, thereby allowing for the increased efficiency in sending graphics command API calls (and responses) between the guest process and the host process.

Operating systems typically have two basic modes in which the operating systems can execute a program: the user-mode and the kernel-mode. Every user process operates under the user mode. In user mode, processes have direct access to memory without needing to make system calls. But the access is restricted via virtual memory and paging, so each user mode process can only access a subset of physical memory via a virtual address range that is controlled by the kernel. User mode processes generally cannot access other hardware resources. The computing system starts in the kernel mode when the computing system boots up. The kernel node has direct access to all the underlying hardware resources. In the kernel mode, all memory addresses are accessible, and all processor instructions are executable.

As shown in FIG. 1, host computing system 100 may represent any type of computing system capable of executing a virtual environment that supports execution of distinct and separate virtual machines via the same underlying hardware of host computing system 100 in an isolated (or, in other words, permission restricted) manner. Examples of host computing system 100 may include a server, a disaggregated server, a personal computer, a workstation, a self-learning machine (e.g., a neural network), a mobile device (e.g., a cell phone, a smart phone, other cellular handset, a tablet computer (such as an iPad™)), an Internet appliance, a smart television (TV), a digital versatile disk (DVD) player, a compact disc (CD) player, a digital video recorder (DVR), a Blu-ray player, a video gaming console, a personal video recorder, a set top box, a headset (e.g., an extended reality (XR) headset (including an augmented reality (AR) headset, a virtual reality (VR) headset, a mixed reality (MR) headset, etc.)), a smart watch, or other wearable device, or any other type of computing device.

Host computing system 100 may include processor circuitry to execute instructions to perform processing. As used herein, processor circuitry is defined to include: (i) one or more special purpose electrical circuits structured to perform specific operation(s) and including one or more semiconductor-based logic devices (e.g., electrical hardware implemented by one or more transistors); and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As shown in the example of FIG. 1, host computing system 100 may execute a host operating system (OS) 102. Although not shown in the example of FIG. 1 for ease of illustration purposes, host computing system 100 may include processor circuitry, various controllers including one or more network interface cards (NICs), etc.), storage (e.g., memory, such as caches, random access memory (RAM), including variations thereof, Flash memory, etc.; solid state drives, hard disk drives, and other storage mediums), and other hardware to support execution of host OS 102.

Host OS 102 may be referred to as a "host" in the sense that host OS 102 supports execution of a virtual environment that facilitates hosting of a guest process 120. Host OS 102 may include host process (e.g., a hypervisor) 140 that manages the virtual environment in terms of managing access to the underlying hardware of host computing system 100. Host process 140 may, for example, allocate storage from the underlying storage for use solely by a guest VM 105, reserve processor cycles of one or more CPUs (or CPU cores) for use by a guest VM 105, reserve GPU cycles/pipeline for use by a guest VM 105, etc. Host process 140 may then schedule execution of guest VM 105 via the underlying processing circuitry of host computing system 100 while maintaining restrictions through permissions that limit interactions between VMs and effectively isolate VM from impacting other VMs, host OS 102 and/or host computing system 100. Host process 140 may enforce these restrictions to improve security with respect to VMs (from being tampered with by host OS 102 but also by other VMs) and with respect to host OS 102 and host computing system 100.

As further shown in the example of FIG. 1, host OS 102 may include a UI module 116 that may manage user interactions with host computing system 100. UI module 116 may receive one or more indications of input (e.g., voice input, gesture input, etc.) from a user as the user interacts with a user interface presented by a UI hardware component (often denoted as "UIC"). UI Module 116 may also present graphics content rendered via the graphics software stack for consumption by a user of host computing system 100.

As noted above, the virtual environment may allow for guest VM 105 to execute guest process 120 that is separate from host process 140 executed by host computing system 100. Guest process 120 may allow for execution of different applications (e.g., application 133) that are unavailable for execution by host process 140. In other words, application 133 is native to guest process 120 but not natively executable by host process 140. These different applications may include various video games (and for purposes of illustration application 133 is assumed to be a video game and may be referred to as "video game 133", although application 133 may perform any desired function using graphics commands to display an image on a display screen of host computing system 100) that are optimized for guest process 120. Guest VM 105 may therefore emulate the native hardware architecture required for executing guest process 120 (along with video game 133) and thereby enable video game 133 to be executed within a different hardware architecture (e.g., the x86 hardware architecture) executing host OS 102.

In operation, host process 140 may initiate execution of guest process 120 to support execution of application 133. An application 133 may be "native" in the sense that application 133 is programmed according to the same hardware architecture (e.g., processing architecture, such as the ARM® architecture) for which guest process 120 is configured for execution.

Guest process 120 may interface with host process 140 to initiate execution of graphics rendering operations as a process separate from guest process 120 and therefore may have different permissions that reduce security risks for host computing system 100 and/or host OS 102.

As described in this disclosure, a GPU driver, running in the guest process, may be partitioned into two parts: guest user mode GPU driver 142 and guest kernel mode virtual I/O driver 144. A corresponding GPU driver, running in host process 140 within host OS 102 of host computing system 100 may also be partitioned into two parts: host user mode virtual I/O device 146 and host kernel mode GPU driver 147.

Guest process 120 may represent a guest graphics software stack that includes guest user mode GPU driver 142 and guest kernel mode virtual I/O driver 144. Host process 140 may represent a host graphics software stack that includes host user mode virtual I/O device 146 and host kernel mode GPU driver 147 that conforms to the standardized graphics API and executes OS API stream 154 received from guest kernel mode virtual I/O driver 144 to render graphics content stored to mapped GPU memory 148B.

Guest process 120 includes application 133. Application 133 may make graphics command API calls to virtual user mode GPU driver 142. Generally, guest user mode GPU driver 142 receives graphics API calls from application 133 and makes an OS API call to guest kernel mode virtual I/O driver 144. Guest kernel mode virtual I/O driver 144 translates the OS API call into a virtual I/O command buffer and sends a pointer to the virtual I/O command buffer to host user mode virtual I/O device 146. Host user mode virtual I/O device 146 translates the virtual I/O command buffer back to the OS API call and makes the OS API call to host kernel mode GPU driver 147. Host kernel model GPU driver receives the OS API call and communicates to GPU hardware to execute commands in shared memory.

Guest kernel mode virtual I/O driver 144 may configure guest process 120 to support the mapping of the memory between guest process 120 and host process 140 to facilitate execution of the graphical rendering API used by application 133 for rendering graphics (which is another way of referring to graphics content). Guest kernel mode virtual I/O driver 144 may configure host process 120 either directly or indirectly via host OS hypervisor 104 (in order to make mapped GPU memory 148A available to guest process 120). Guest kernel mode virtual I/O driver 144 may also interface with host user mode virtual I/O device 146 to configure mapped GPU memory 148B that references the same physical memory of host computing system 100 as mapped GPU memory 148A. In this way, the same physical underlying memory of host computing system 100 is "mapped" between guest process 120 and host process 140 (e.g., by way of pointers or other logical abstractions that facilitate access to the same underlying memory).

Mapping memory in this way may enable application 133 to output various graphical elements (e.g., meshes, point clouds, textures, images, video, etc.) that are required for rendering graphics to mapped GPU memory 148A. Host user mode virtual I/O device 146 may receive OS API stream 154 that reference mapped GPU memory 148A, but because of the memory mapping, host user mode virtual I/O device 146 (executing as a separate and distinct host process 140 in an isolated virtual machine 105B) may instead reference mapped GPU memory 148B via host kernel mode GPU driver 147 to execute OS API stream 154. In this way, the host graphics software stack may be isolated to a separate virtual machine while still maintaining the appropriate memory type that is required by the standardized graphics API.

The techniques described herein may improve operation of host computing system 100 itself. That is, host computing system 100 may identify when host process 140 may be executed as an isolated restricted process that potentially reduces security risks that may occur should guest OS 132 allow execution of malicious applications. By executing host process 140 separately, host computing system 100 may also facilitate more optimized execution (in terms of latency, computing resource utilization—such as processor cycles, GPU cycles, memory, memory bandwidth, etc., and associated power consumption) by way of potential improvements provided by the standardized graphics APIs.

Figure 2:
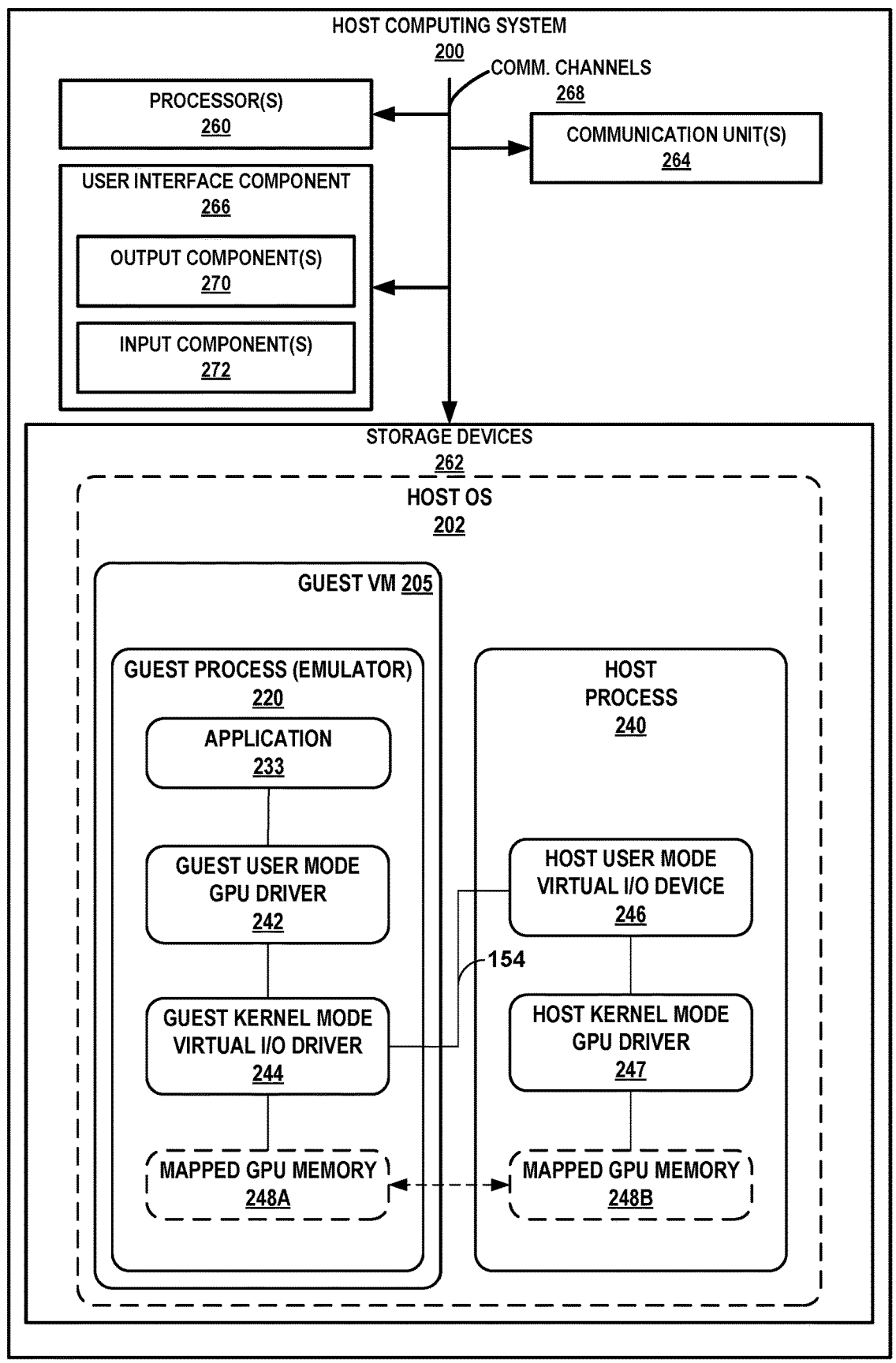
FIG. 2 illustrates an example host computing system to perform various aspects of splitting a GPU driver in accordance with various aspects of the techniques described in this disclosure.

FIG. 2 illustrates an example host computing system to perform various aspects of splitting a GPU driver in accordance with various aspects of the techniques described in this disclosure. FIG. 2 illustrates only one example of host computing system 200, and many other examples of host computing system 200 may be used in other instances and may include a subset of the components included in example host computing system 200 or may include additional components not shown in FIG. 2. Host computing system 200 may represent one example of host computing system 100 shown in the example of FIG. 1.

As shown in the example of FIG. 2, host computing system 200 includes one or more processors 260, one or more storage devices 262, one or more communication units 264, and one or more user interface components (UIC) 266, each of which are interconnected by communication channels 268. Processors 260 may implement processor circuitry functionality and/or execute instructions associated with host computing system 200. Examples of processors 260 include application processors, display controllers, auxiliary processors, one or more sensor hubs, and any other hardware configured to function as a processor, a processing unit, processing circuitry, or a processing device, including a CPU (which may have one or more "cores") and the above noted GPU. In this respect, processors 260 may represent both the CPU and the GPU, which may be integrated (meaning packaged in a shared CPU/GPU chip architecture and often sharing integrated memory, buffers, memory busses, etc.) or dedicated (meaning that the GPU is separate from the CPU chip architecture and therefore does not inherently share memory, buffers, memory busses, etc.).

Storage devices 262 may represent one or more memories and/or storage devices configured to store information for processing during operation of host computing device 200. In some examples, storage devices 262 may represent a temporary memory, meaning that a primary purpose of storage devices 262 is not long-term storage. Storage devices 262 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 262 may, in some examples, also include one or more machine-readable storage mediums. Storage devices 262 may include one or more non-transitory machine-readable storage mediums. Storage devices 262 may be configured to store larger amounts of information than typically stored by volatile memory. Storage devices 262 may further be configured for long-term storage of information as non-volatile memory space and retain information after power on/off cycles. Examples of non-volatile memories include magnetic hard discs, optical discs, floppy discs, Flash memories, or forms of electrically programmable memories (EPROM) or electrically erasable and programmable (EEPROM) memories.

Storage devices 262 may store program instructions and/or information (e.g., data) associated with host OS 202 (which is an example of host OS 102), including host process 240 (shown in FIG. 2 and represents an example of host process 140), UI module 116 (not shown in FIG. 2), and any other software capable of being executed by processors 260. Storage devices 262 may include a memory configured to store data or other information associated with host OS 202, including host process 240 (shown in FIG. 2 and represents an example of host process 140) and UI module 116 (not shown in FIG. 2), and any other software capable of being executed by processors 260.

Guest process 220 (which includes application 233, guest user mode GPU driver 242, and guest kernel mode virtual I/O driver 244) may be separately stored to storage devices 262, but again are shown logically to denote that guest process 220 components are executed as a part of different distinct processes (as described above with respect to the example of FIG. 1).

Guest process 220 may represent an example of guest process 120, guest user mode GPU driver 242 and guest kernel mode virtual I/O driver 244 represent examples of guest user mode GPU driver 142 and guest kernel mode virtual I/O driver 144, respectively, and application 233 represents an example of application 133. In this respect, these components of FIG. 2 may represent similar if not the same components described above with respect to FIG. 1 but shown in the context of an example underlying hardware architecture of host computing system 200, which is, for purposes of example, assumed to conform to an x86 processing architecture (including motherboards, memory, and/or other supporting components for implementing an x86 hardware architecture required for implementing virtualization in the manner described herein).

Communication unit(s) 264 may represent one or more units configured to communicate with external devices via one or more wired and/or wireless networks by transmitting and/or receiving network signals via the one or more networks. Examples of communication units 264 include a network interface card (e.g., such as an Ethernet card), an optical transceiver, a radio frequency transceiver, a global positioning satellite (GPS) receiver, a cellular transceiver, or any other type of device that can send and/or receive data. Other examples of communication units 264 may include short wave radios, cellular data radios, wireless network radios, as well as universal serial bus (USB) controllers.

UIC 266 may be implemented using various technologies. For instance, UIC 266 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. As further shown in the example of FIG. 2, UIC 266 may include one or more input component(s) 270 and one or more output component(s) 272.

One or more input component(s) 270 of host computing system 200 may receive an input. Examples of inputs are tactile, audio, and video input. Input component(s) 270, in one example, includes a presence-sensitive input device (e.g., a touch sensitive screen, a presence-sensitive display), mouse, keyboard, voice responsive system, video camera, microphone or any other type of device for detecting input from a human or machine. In some examples, input component(s) 270 may include one or more sensor components such as one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output component(s) 272 of host computing system 200 may generate output. Examples of output are tactile, audio, and video output. Output component(s) 272 of host computing system 200, in one example, includes a portable storage device (PSD), sound card, video graphics adapter card, speaker, cathode ray tube (CRT) monitor, liquid crystal display (LCD), or any other type of device for generating output to a human or machine.

While illustrated as an internal component of host computing system 200, UIC 266 may also represent an external component that shares a data path with host computing system 200 for transmitting and/or receiving input and output. For instance, in one example, UIC 266 represents a built-in component of host computing system 200 located within and physically connected to the external packaging of host computing system 200 (e.g., a display on a mobile phone). In another example, UIC 266 represents an external component of host computing system 200 located outside and physically separated from the packaging or housing of host computing system 200 (e.g., a monitor, a projector, etc. that shares a wired and/or wireless data path with host computing system 200).

Figure 3:
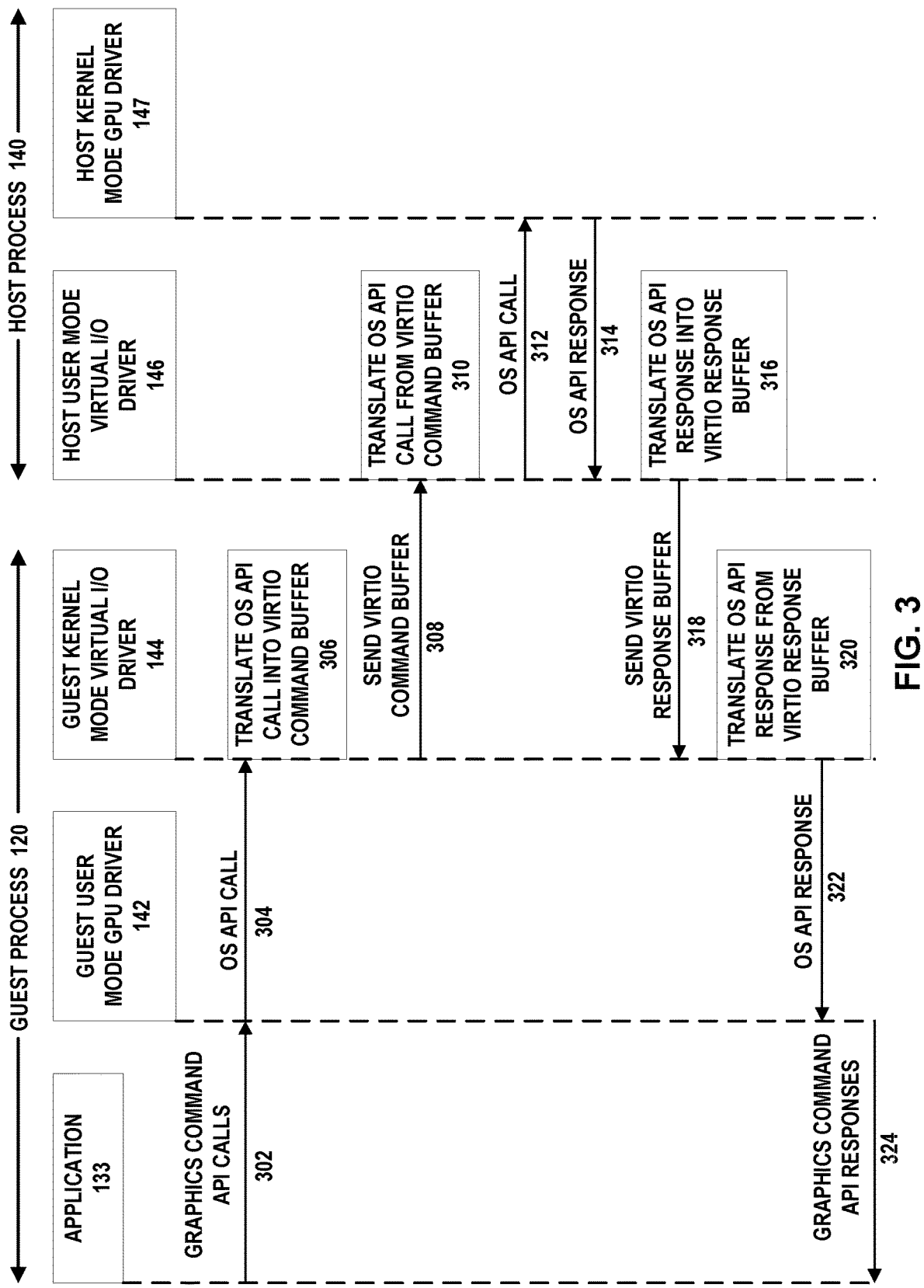
FIG. 3 illustrates interactions between a guest process and a host process in accordance with various aspects of the techniques described in this disclosure.

FIG. 3 illustrates interactions between a guest process 120 and a host process 140 in accordance with various aspects of the techniques described in this disclosure. At action 302, application 133 makes one or more graphics command API calls to guest user mode GPU driver 142. Guest user mode GPU driver 142 triggers an OS API call in response to at least one of the one or more graphics API calls received from application 133 (some graphics API calls do not result in triggering of OS API calls), and at action 304 makes the OS API call to guest kernel mode virtual I/O driver 144. Guest kernel mode virtual I/O driver 144 at action 306 translates the OS API call into a virtual I/O (virtio) command buffer stored in one or more of storage devices 262. At action 308, guest kernel mode virtual I/O driver 144 sends the addresses of the virtio command buffer and a virtio response buffer to host user mode virtual I/O driver 146. Guest kernel mode virtual I/O driver 144 then blocks until the host process 140 returns a response. Host user mode virtual I/O driver 146 at action 310 translates the OS API call from the virtio command buffer. Host user mode virtual I/O driver 146 at action 312 makes the OS API call to host kernel mode GPU driver 147.

Optionally, host kernel mode GPU driver 147 may then send one or more graphics commands based at least in part from the OS API call to a GPU (not shown in FIG. 3). Optionally, in response to receiving graphics commands, the GPU may send one or more responses back to host kernel mode GPU driver 147.

Upon performance of the OS API call, host kernel mode GPU driver 3147 sends OS API response (which may optionally include one or more graphics command responses) at action 314 to host user mode virtual I/O driver 146. Host user mode virtual I/O driver 146 at action 316 translates the OS API response into a virtio response buffer and sends the address of the virtio response buffer to guest kernel mode virtual I/O driver 144 at action 318. Guest kernel mode virtual I/O driver 144 then translates the OS API response from the virtio response buffer at action 320 and sends the OS API response at action 322 to guest user mode GPU driver 142. Finally, at action 324, guest user mode GPU driver 142 translates the OS API response into one or more graphics command API responses and sends the graphics command API responses at action 324 to application 133.

Although the sequence above describes processing of synchronous graphics command API calls, some graphics command API calls may be processed asynchronously.

Figure 4:
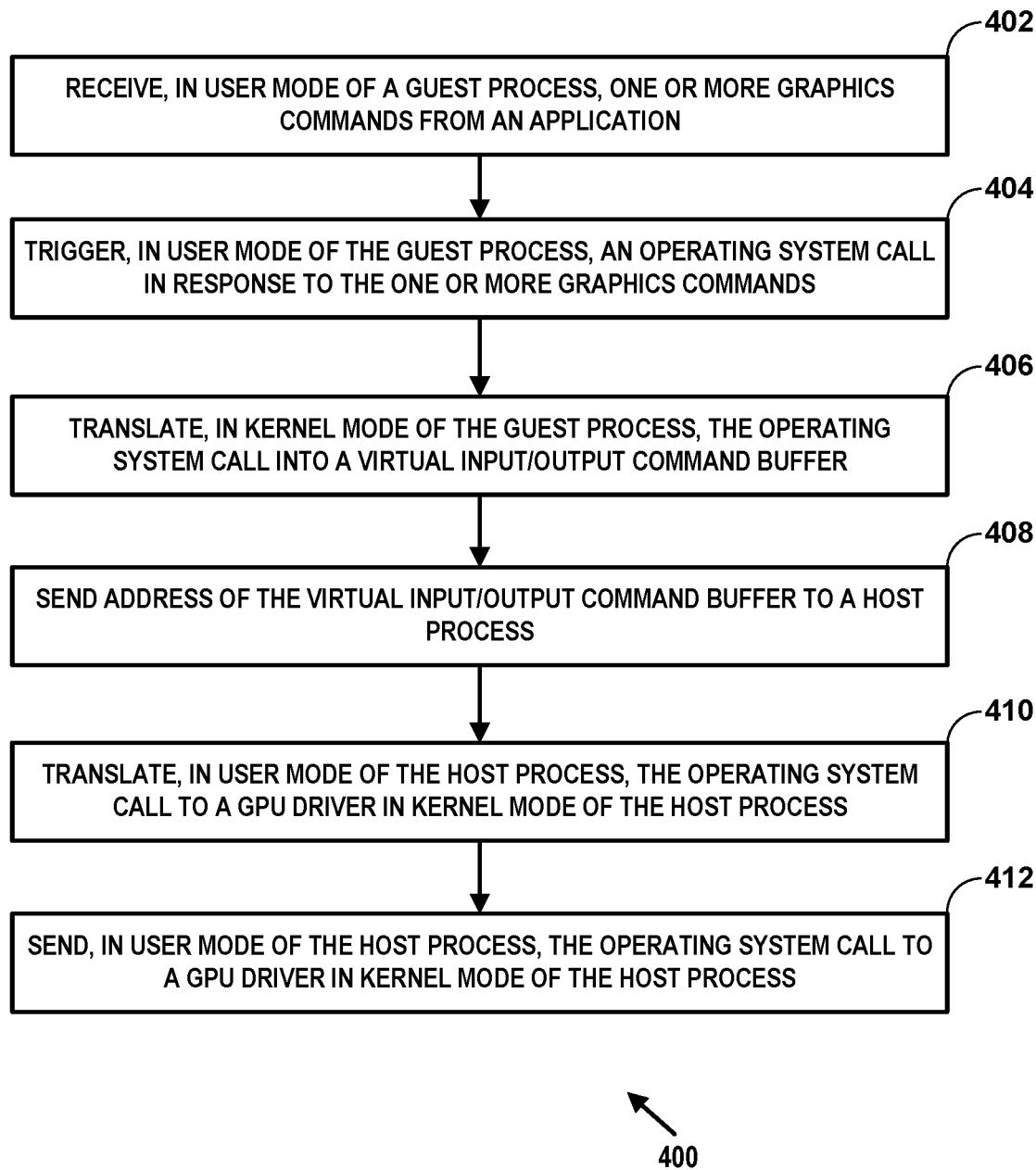
FIG. 4 illustrates sending graphics command calls from a guest process to a host process in accordance with various aspects of the techniques described in this disclosure.

FIG. 4 illustrates sending graphics commands from a guest process to a host process in accordance with various aspects of the techniques described in this disclosure. At block 402 of method 400, user mode of a guest process 120 (e.g., guest user mode GPU driver 142) receives one or more graphics commands from application 133. At block 404, user mode of guest process 120 (e.g., guest user mode GPU driver 142) triggers an operating system call (e.g., to guest kernel mode virtual I/O driver 144) in response to the one or more graphics commands. At block 406, kernel mode of guest process 120 (e.g., guest kernel mode virtual I/O driver 144) translates the operating system call into a virtual input/output command buffer. At block 408, kernel mode of guest process 120 (e.g., guest kernel mode virtual I/O driver 144) sends the address of the virtual input/output command buffer to user mode of host process 140 (e.g., to host user mode virtual I/O device 146). At block 410, user mode of the host process 140 (e.g., host user mode virtual I/O device 146) translates the virtual input/output command buffer into the operating system call. At block 412, user mode of host process 140 (e.g., host user mode virtual I/O device 146) sends the operating system call to kernel mode of the host process (e.g., host kernel mode GPU driver 147).

Figure 5:
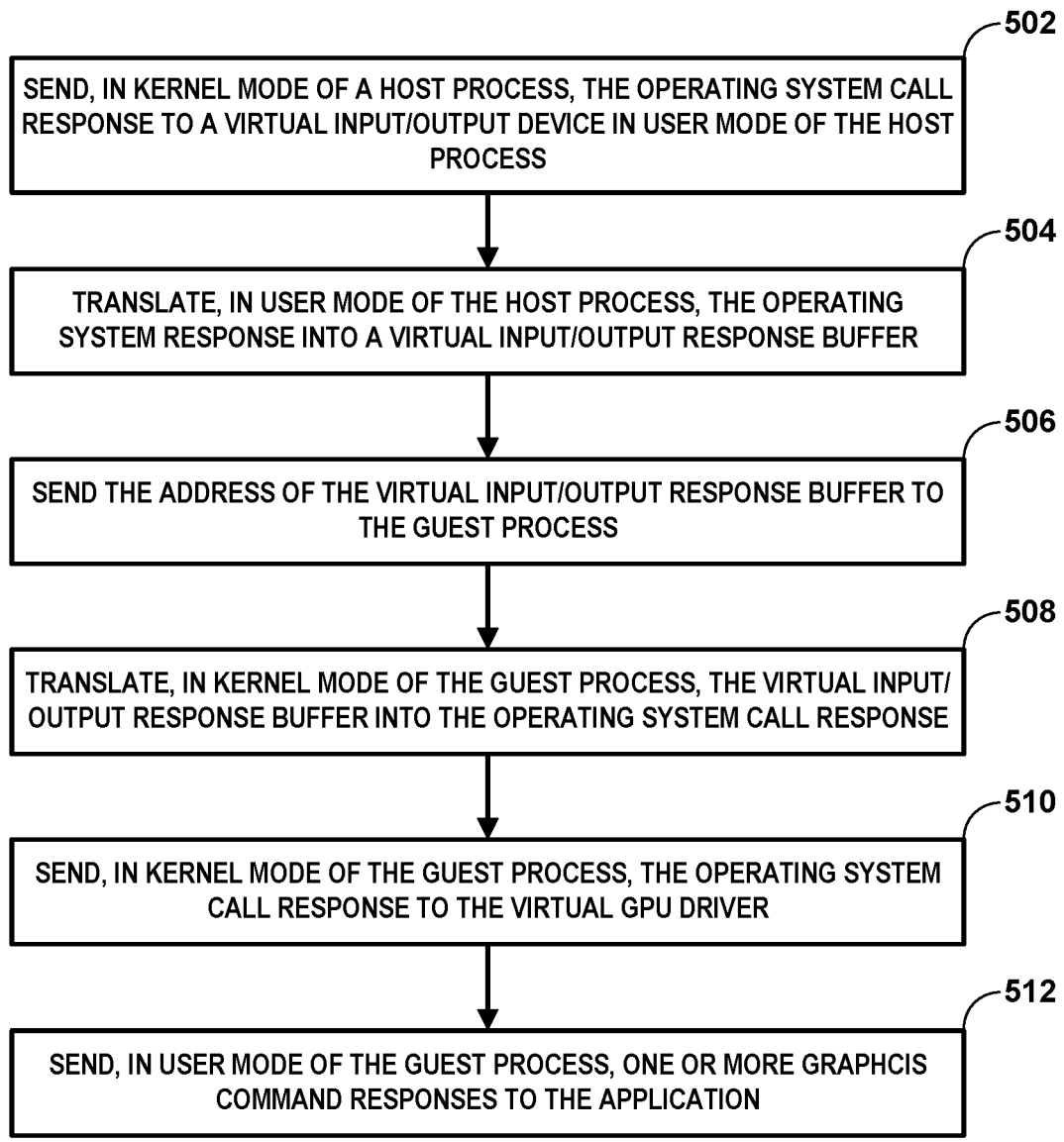
FIG. 5 illustrates sending graphics command responses from a host process to a guest process in accordance with various aspects of the techniques described in this disclosure.

FIG. 5 illustrates sending graphics command responses from a host process to a guest process in accordance with various aspects of the techniques described in this disclosure. At block 502 of method 500, kernel mode of host process 140 (e.g., host kernel mode GPU driver 147) sends an operating system call response to a virtual input/output device (e.g., host user mode virtual I/O device 146) in user mode of the host process. At block 504, user mode of host process 140 (e.g., host user mode virtual I/O device 146) translates the operating system call into a virtual input/output response buffer. At block 506, user mode of host process 140 (e.g., host user mode virtual I/O device 146) sends the address of the virtual input/output response buffer to kernel mode of guest process 120 (e.g., guest kernel mode virtual I/O driver 144). At block 508, kernel mode of guest process 120 (e.g., guest kernel mode virtual I/O driver 144) translates the virtual input/output response buffer into the operating system call response. At block 510, kernel mode of guest process 120 (e.g., guest kernel mode virtual I/O driver 144) sends the operating system call response to a GPU driver in user mode of guest process 120 (e.g., guest user mode GPU driver 142). At block 512, user mode of guest process 120 (e.g., guest user mode GPU driver 142) sends one or more graphics command responses to application 133.

Accordingly, the technology described herein improves the operation of host computing system 100 by decreasing the amount of API calls being processed between guest process 120 and host process 140.

In this way, various aspects of the techniques described in this disclosure may enable the following examples.

Example 1 is a method including receiving, in a user mode of a guest process executed by a computing system, one or more graphics commands from an application of the guest process; triggering, in the user mode of the guest process, an operating system call in response to the one or more graphics commands; translating, in a kernel mode of the guest process, the operating system call into a first virtual buffer; translating, in the user mode of a host process executed by the computing system, the first virtual buffer into the operating system call; and sending, in the user mode of the host process, the operating system call to a graphics processing unit driver in a kernel mode of the host process.

Example 2. The method of example 1, including sending an address of the first virtual buffer from the guest process to the host process in response to translating the operating system call into the first virtual buffer.

Example 3. The method of example 1, wherein the guest process emulates a first operating system and the host process executes a second operating system, the first operating system different than the second operating system.

Example 4. The method of example 1, including sending, by the graphics processing unit driver in the kernel mode of the host process, one or more graphics processing unit commands, based at least in part on the operating system call, to a graphics processing unit.

Example 5. The method of example 4, including receiving, by the graphics processing unit driver in the kernel mode of the host process, one or more responses from the graphics processing unit for the one or more graphics processing unit commands.

Example 6. The method of example 1, including sending, in the kernel mode of the host process, an operating system call response to a virtual device in user mode of the host process; translating, in the user mode of the host process, the operating system call response into a second virtual buffer; translating, in the kernel mode of the guest process, the second virtual buffer into the operating system call response; and sending, in kernel mode of the guest process, the operating system call response to virtual graphics processing unit driver in user mode of the guest process.

Example 7. The method of example 6, including sending, in the user mode of the guest process, one or more graphics command responses to the application.

Example 8. The method of example 6, including sending the address of the second virtual buffer to the guest process in response to translating the operating system call response into the second virtual buffer.

Example 9 is an apparatus including a memory to store a host operating system; and processing circuitry to execute the host operating system, the host operating system including a guest process and a host process, to receive, in a user mode of the guest process, one or more graphics commands from an application of the guest process; trigger, in the user mode of the guest process, an operating system call in response to the one or more graphics commands; translate, in a kernel mode of the guest process, the operating system call into a first virtual buffer; translate, in the user mode of the host process executed by the computing system, the first virtual buffer into the operating system call; and send, in the user mode of the host process, the operating system call to a graphics processing unit driver in a kernel mode of the host process.

Example 10. The apparatus of example 9, including the processor circuitry to send an address of the first virtual buffer from the guest process to the host process in response to translating the operating system call into the first virtual buffer.

Example 11. The apparatus of example 9, wherein the guest process emulates an operating system different than the host operating system.

Example 12. The apparatus of example 9, including the processor circuitry to send, by the graphics processing unit driver in the kernel mode of the host process, one or more graphics processing unit commands, based at least in part on the operating system call, to a graphics processing unit.

Example 13. The apparatus of example 12, including the processor circuitry to receive, by the graphics processing unit driver in the kernel mode of the host process, one or more responses from the graphics processing unit for the one or more graphics processing unit commands.

Example 14. The apparatus of example 9, including the processor circuitry to send, in the kernel mode of the host process, an operating system call response to a virtual device in user mode of the host process; translate, in the user mode of the host process, the operating system call response into a second virtual buffer; translate, in the kernel mode of the guest process, the second buffer into the operating system call response; and send, in kernel mode of the guest process, the operating system call response to a virtual graphics processing unit driver in user mode of the guest process.

Example 15. The apparatus of example 14, including the processor circuitry to send, in the user mode of the guest process, one or more graphics command responses to the application.

Example 16. The apparatus of example 9, including the processor circuitry to send the address of the second virtual buffer to the guest process in response to translating the operating system call response into the second virtual buffer.

Example 17 is a non-transitory computer-readable storage medium having instructions stored thereon that, when executed, cause one or more processors to execute a host operating system, the host operating system including a guest process and a host process, to receive, in a user mode of the guest process, one or more graphics commands from an application of the guest process; trigger, in the user mode of the guest process, an operating system call in response to the one or more graphics commands; translate, in a kernel mode of the guest process, the operating system call into a first virtual buffer; translate, in the user mode of the host process executed by the computing system, the first virtual buffer into the operating system call; and send, in the user mode of the host process, the operating system call to a graphics processing unit driver in a kernel mode of the host process.

Example 18. The non-transitory computer-readable storage medium of example 17, including having instructions stored thereon that, when executed, cause one or more processors to send an address of the first virtual buffer from the guest process to the host process in response to translating the operating system call into the first virtual buffer.

Example 19. The non-transitory computer-readable storage medium of example 17, including having instructions stored thereon that, when executed, cause one or more processors to send, in the kernel mode of the host process, an operating system call response to a virtual device in user mode of the host process; translate, in the user mode of the host process, the operating system call response into a second virtual buffer; translate, in the kernel mode of the guest process, the second virtual buffer into the operating system call response; and send, in kernel mode of the guest process, the operating system call response to a virtual graphics processing unit driver in user mode of the guest process.

Example 20. The non-transitory computer-readable storage medium of example 17, including having instructions stored thereon that, when executed, cause one or more processors to send, in the user mode of the guest process, one or more graphics command responses to the application.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method comprising:
receiving, in a user mode of a guest process executed by a computing system, one or more graphics commands from an application of the guest process;
triggering, in the user mode of the guest process, an operating system call in response to the one or more graphics commands;
translating, in a kernel mode of the guest process, the operating system call into a first virtual buffer;
translating, in the user mode of a host process executed by the computing system, the first virtual buffer into the operating system call; and
sending, in the user mode of the host process, the operating system call to a graphics processing unit driver executing in a kernel mode of the host process.

2. The method of claim 1, comprising:
sending an address of the first virtual buffer from the guest process to the host process in response to translating the operating system call into the first virtual buffer.

3. The method of claim 1, wherein the guest process emulates a first operating system and the host process executes a second operating system, the first operating system different than the second operating system.

4. The method of claim 1, comprising:
sending, by the graphics processing unit driver in the kernel mode of the host process, one or more graphics processing unit commands, based at least in part on the operating system call, to a graphics processing unit.

5. The method of claim 4, comprising:
receiving, by the graphics processing unit driver in the kernel mode of the host process, one or more responses from the graphics processing unit for the one or more graphics processing unit commands.

6. The method of claim 1, comprising:
sending, in the kernel mode of the host process, an operating system call response to a virtual device in user mode of the host process;
translating, in the user mode of the host process, the operating system call response into a second virtual buffer;
translating, in the kernel mode of the guest process, the second virtual buffer into the operating system call response; and
sending, in kernel mode of the guest process, the operating system call response to a virtual graphics processing unit driver in user mode of the guest process.

7. The method of claim 6, comprising:
sending, in the user mode of the guest process, one or more graphics command responses to the application.

8. The method of claim 6, comprising:
sending the address of the second virtual buffer to the guest process in response to translating the operating system call response into the second virtual buffer.

9. An apparatus comprising:
a memory to store a host operating system; and
processing circuitry to:
execute the host operating system, the host operating system including a guest process and a host process, to:
receive, in a user mode of the guest process, one or more graphics commands from an application of the guest process;
trigger, in the user mode of the guest process, an operating system call in response to the one or more graphics commands;
translate, in a kernel mode of the guest process, the operating system call into a first virtual buffer;
translate, in the user mode of the host process executed by the computing system, the first virtual buffer into the operating system call; and
send, in the user mode of the host process, the operating system call to a graphics processing unit driver executing in a kernel mode of the host process.

10. The apparatus of claim 9, comprising the processor circuitry to:
send an address of the first virtual buffer from the guest process to the host process in response to translating the operating system call into the first virtual buffer.

11. The apparatus of claim 9, wherein the guest process emulates an operating system different than the host operating system.

12. The apparatus of claim 9, comprising the processor circuitry to:
send, by the graphics processing unit driver in the kernel mode of the host process, one or more graphics processing unit commands, based at least in part on the operating system call, to a graphics processing unit.

13. The apparatus of claim 12, comprising the processor circuitry to:

receive, by the graphics processing unit driver in the kernel mode of the host process, one or more responses from the graphics processing unit for the one or more graphics processing unit commands.

14. The apparatus of claim 9, comprising the processor circuitry to:
send, in the kernel mode of the host process, an operating system call response to a virtual device in user mode of the host process;
translate, in the user mode of the host process, the operating system call response into a second virtual buffer;
translate, in the kernel mode of the guest process, the second virtual buffer into the operating system call response; and
send, in kernel mode of the guest process, the operating system call response to a virtual graphics processing unit driver in user mode of the guest process.

15. The apparatus of claim 14, comprising the processor circuitry to:
send, in the user mode of the guest process, one or more graphics command responses to the application.

16. The apparatus of claim 9, comprising the processor circuitry to:
send the address of the second virtual buffer to the guest process in response to translating the operating system call response into the second virtual buffer.

17. A non-transitory computer-readable storage medium having instructions stored thereon that, when executed, cause one or more processors to:
execute a host operating system, the host operating system including a guest process and a host process, to:
receive, in a user mode of the guest process, one or more graphics commands from an application of the guest process;
trigger, in the user mode of the guest process, an operating system call in response to the one or more graphics commands;
translate, in a kernel mode of the guest process, the operating system call into a first virtual buffer;
translate, in the user mode of the host process executed by the computing system, the first virtual buffer into the operating system call; and
send, in the user mode of the host process, the operating system call to a graphics processing unit driver executing in a kernel mode of the host process.

18. The non-transitory computer-readable storage medium of claim 17, comprising having instructions stored thereon that, when executed, cause one or more processors to:
send an address of the first virtual buffer from the guest process to the host process in response to translating the operating system call into the first virtual buffer.

19. The non-transitory computer-readable storage medium of claim 17, comprising having instructions stored thereon that, when executed, cause one or more processors to:
send, in the kernel mode of the host process, an operating system call response to a virtual device in user mode of the host process;
translate, in the user mode of the host process, the operating system call response into a second virtual buffer;
translate, in the kernel mode of the guest process, the second virtual buffer into the operating system call response; and
send, in kernel mode of the guest process, the operating system call response to a virtual graphics processing unit driver in user mode of the guest process.

20. The non-transitory computer-readable storage medium of claim 17, comprising having instructions stored thereon that, when executed, cause one or more processors to:
send, in the user mode of the guest process, one or more graphics command responses to the application.

\* \* \* \* \*